(12) United States Patent
Koehler et al.

(10) Patent No.: US 8,493,199 B2
(45) Date of Patent: Jul. 23, 2013

(54) DEVICE AND METHOD FOR APPROVING AUTOMATIC GUIDANCE OF A VEHICLE

(75) Inventors: Markus Koehler, Ludwigsburg (DE);
Michael Scherl, Bietigheim (DE);
Matthias Haug, Pleidelsheim (DE);
Uwe Zimmermann, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 216 days.

(21) Appl. No.: 12/737,205

(22) PCT Filed: May 15, 2009

(86) PCT No.: PCT/EP2009/055893
§ 371 (c)(1),
(2), (4) Date: Mar. 3, 2011

(87) PCT Pub. No.: WO2010/000537
PCT Pub. Date: Jan. 7, 2010

(65) Prior Publication Data
US 2011/0148613 A1    Jun. 23, 2011

(30) Foreign Application Priority Data

Jul. 3, 2008  (DE) .......................... 10 2008 040 149

(51) Int. Cl.
*G01C 11/36*  (2006.01)
*B60T 7/12*  (2006.01)

(52) U.S. Cl.
USPC ............... 340/438; 701/23; 701/28; 180/272; 180/275; 340/457.3

(58) Field of Classification Search
USPC ............... 701/23, 28; 180/272, 275; 340/438, 340/457.3
See application file for complete search history.

(56) References Cited

U.S. PATENT DOCUMENTS 4,931,930 A * 6/1990 Shyu et al. ...................... 701/36
2008/0065293 A1 * 3/2008 Placke et al. .................... 701/41

FOREIGN PATENT DOCUMENTS

| DE | 38 13 083 | 11/1989 |
| DE | 44 14 216 | 4/1995 |
| DE | 197 34 307 | 2/1999 |
| DE | 19734307 A1 * | 2/1999 |
| DE | 199 21 488 | 11/2000 |
| DE | 100 39 795 | 3/2002 |
| DE | 10 2004 051 963 | 5/2006 |

* cited by examiner

*Primary Examiner* — Daniel Wu
*Assistant Examiner* — Benyam Haile
(74) *Attorney, Agent, or Firm* — Kenyon & Kenyon LLP

(57) ABSTRACT

A device for approving automatic guidance of a vehicle, having an interface to a monitoring apparatus for at least partially monitoring a vehicle driver located in the vehicle, having an interface to an apparatus for automatically guiding the vehicle and for ascertaining a travel direction of the vehicle when automatic guidance is to be performed, and having an analysis unit for comparing a field of vision of the driver, which is determined from the monitoring of the driver, to the travel direction of the vehicle during the automatic guidance, automatic guidance only being approved if the travel direction of the vehicle during the automatic guidance is in the field of vision of the driver.

15 Claims, 3 Drawing Sheets

DEVICE AND METHOD FOR APPROVING AUTOMATIC GUIDANCE OF A VEHICLE

BACKGROUND OF THE INVENTION

1. Field of the Invention

The present invention is directed to a device and a method for approving automatic guidance of a vehicle.

2. Description of Related Art

A method for warning a driver of a vehicle is already known from published German patent document DE 100 39 795 A1, in which warnings are output as a function of an attentiveness of the driver. For this purpose, the viewing direction of the driver is associated with a high attentiveness and the remaining directions are associated with a low attentiveness.

An automatic parking device for vehicles is known from published German patent document DE 38 13 083 A1, which has movement sensors for measuring a movement route of the automobile, obstruction sensors for ascertaining a position of obstructions around the automobile, and a microcomputer, which produces an output signal to control a control mechanism, a gearshift unit, and a brake system of the motor vehicle, in order to park the vehicle automatically.

SUMMARY OF THE INVENTION

The device according to the present invention for approving automatic guidance of a vehicle has the advantage over the related art that automatic guidance of the vehicle is only approved if it is ensured that the field of vision of the driver may detect at least the driving path of the vehicle in the direction in which the vehicle is automatically guided. The field of vision is to refer to the entire spatial area which may be detected by an observer without an eye movement.

It is therefore ensured that the optical sensory channels of the driver detect a driving path in addition to the sensors of the vehicle and it is thus ensured that the driver, who is eventually responsible for the driving actions of the vehicle, actually monitors the travel of the vehicle. If the driver discovers an obstruction in the driving path of the vehicle, he will perceive this obstruction, since the vehicle only performs automatic guidance of the vehicle when the driving path is in the field of vision of the driver. However, if the driver perceives the obstruction, he may react himself and terminate automatic guidance of the vehicle, for example, by initiating a braking action himself.

The present invention therefore prevents the driver with the aid of an automatic driver support from being enticed to no longer observe the driving path of the vehicle during automatic travel. In particular for the case in which obstructions move into the driving path provided for the automatic driving or in which an obstruction detection is incorrect, for example because of a poor detectability of an obstruction, possible damage to the vehicle or to the obstruction may therefore be prevented using the visual detection by the driver as an additional protection measure. Accordingly, it is also possible to reduce redundancy requirements on obstruction detection systems for monitoring the vehicle surroundings and thus the costs for such obstruction detection systems, since the involvement of the driver as an additional monitoring entity may be ensured. For not only may the system for automatic guidance of the vehicle decelerate the vehicle in the event of a detected obstruction, but also the driver himself may perform a deceleration if needed because it is ensured he monitors the driving path of the vehicle. Through the additional monitoring by the driver, error tolerances may additionally be selected as smaller, so that an occurrence of automatic terminations of the automatic driving, which could occur as a result of high safety tolerances, may be reduced.

Accordingly, a method according to the present invention is advantageous in which automatic guidance is only approved if the travel direction of the vehicle during the automatic guidance is in a field of vision of the driver.

Advantageous refinements and improvements of the device specified in the independent claim and the method specified in the independent claim are possible through the measures listed in the dependent claims. The field of vision may thus be detected easily by analysis of the viewing direction and/or the head position of the driver.

Furthermore, it is advantageous according to the present invention that a corresponding approval of automatic driving is used for the case in which the vehicle is automatically guided into a parking space in reverse. In particular, when driving into a parking space, various error sources may be eliminated with the aid of the additional monitoring by the driver. Thus, for example, the vehicle may be braked by the driver if a parking space measurement is performed imprecisely or incorrectly. Furthermore, it is also possible that the driver may react to moving parking space boundaries or obstructions moving into the parking space. In addition, it may advantageously be ensured that a parking procedure may be performed as continuously as possible and without unnecessary termination. Nonetheless, in particular smaller or hard to detect obstructions, such as a small pet, may be reliably detected by a driver and the vehicle may be stopped accordingly.

Furthermore, it is advantageous to provide a camera system for ascertaining a viewing direction or a head position of the vehicle driver, since corresponding detection devices are possibly already present in the vehicle for other purposes for driver monitoring. In addition, the corresponding viewing direction is easily detectable with the aid of an appropriate camera system. In this case, the camera is advantageously situated on a vehicle roof or alternatively on a dashboard of the vehicle. Through this positioning, the driver may be observed without being obstructed in his vision by the camera system.

Furthermore, it is advantageous that for the case in which the driver no longer looks in the appropriate travel direction of the vehicle, automatic guidance is terminated. It may therefore be ensured that the vehicle is only moved automatically in a direction as long as monitoring is ensured by a look of the driver in the appropriate travel direction. For this purpose, it is additionally advantageous to decelerate the vehicle, possibly to a standstill, for the case in which the driver no longer has an appropriate travel direction in his field of vision. In this way, a movement of the vehicle which is no longer monitored by the driver may be prevented during automatic guidance of the vehicle. The driver is advantageously warned before an automatic deceleration, in order to notify the driver of a carried out or imminent termination of the automatic guidance. The driver may either turn his field of vision back to the travel direction of the vehicle, in order to continue the automatic guidance of the vehicle, or may take over the control of the vehicle himself again.

BRIEF DESCRIPTION OF THE DRAWINGS

Exemplary embodiments of the present invention are shown in the drawings and are explained in greater detail in the following description.

DETAILED DESCRIPTION OF THE INVENTION

The device according to the present invention for approving automatic guidance of a vehicle may be used for any desired vehicles and for any desired driving maneuvers. However, automatic guidance of a vehicle is advantageous in particular in those cases in which a computerized control of the vehicle sometimes has an advantage over a manual control of the vehicle by an average driver. This is the case in particular for parking procedures, in particular for parking procedures parallel to a travel direction of the vehicle, during which a driver may often assess a parking space by sight only very poorly and sometimes there is a very small tolerance range in the guidance of the vehicle for steering the vehicle into a desired parking space using as few passes as possible. In addition, the relatively low vehicle velocities, which are typical during a parking procedure, aid automatic control and detection of obstructions in the surroundings of a vehicle.

The present invention is therefore explained hereafter on the example of a parking procedure of a motor vehicle.

Figure 1:
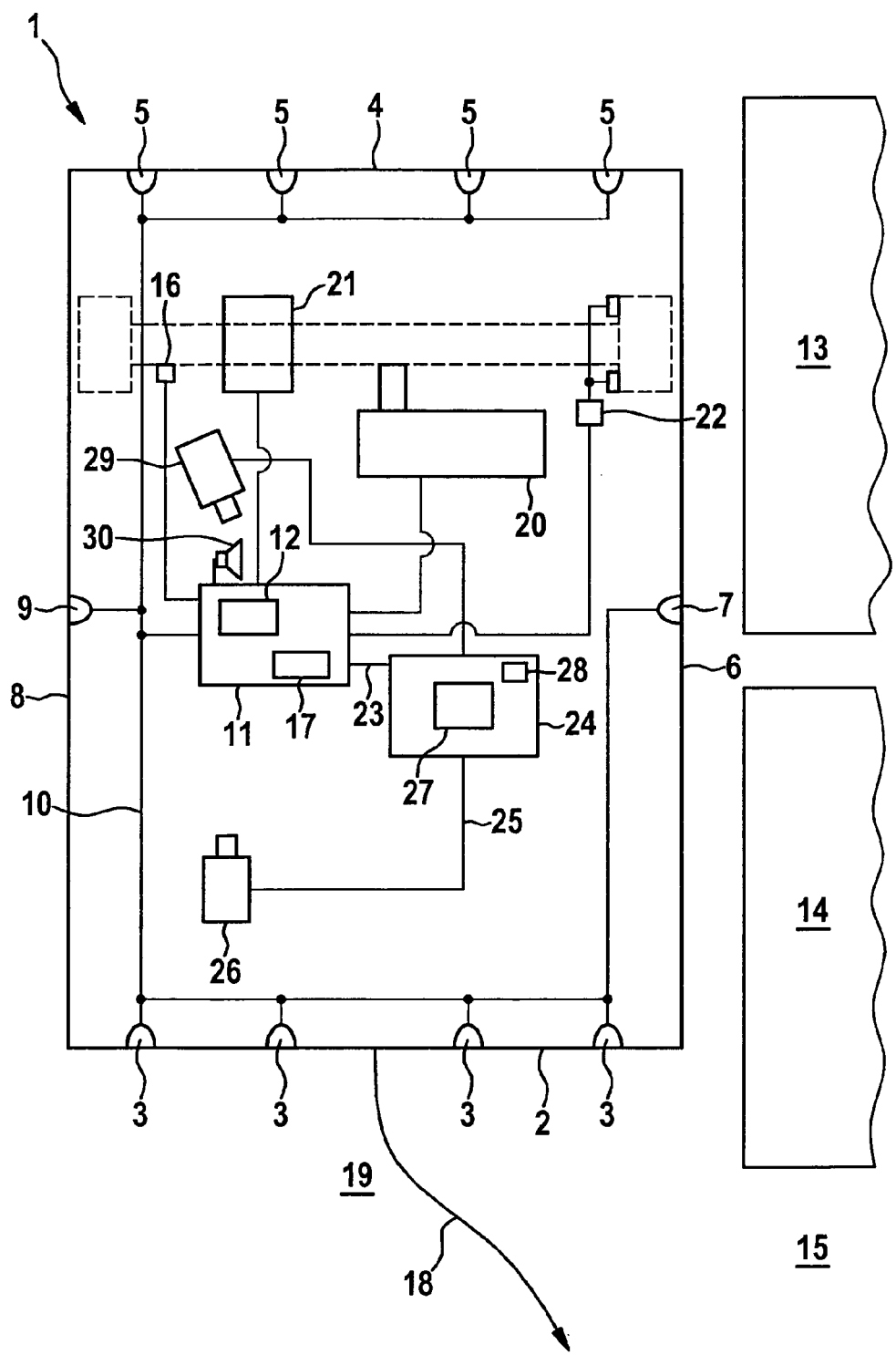
FIG. 1 schematically shows a top view of a vehicle having a device according to the present invention for approving automatic guidance of a vehicle.

A motor vehicle 1 is shown in a schematic top view in FIG. 1. Distance sensors 3 are situated on a rear side 2 of vehicle 1. Distance sensors 5 are also situated accordingly on front side 4 of the vehicle. A distance sensor 7 is also situated on a right vehicle side 6. A distance sensor 9 is also situated accordingly on the left vehicle side 8.

Distance sensors 3, 5, 7, 9 are implemented as ultrasonic sensors, for example. They measure the distances to obstructions in surroundings of the vehicle. The results of the measurement are forwarded to an analysis unit 11 via a data connection 10. Analysis unit 11 has a computer unit 12 and prepares a map of the surroundings from the measured distance data to obstructions 13, 14 in surroundings of the vehicle. In order to measure a parking space 15, the vehicle is guided along parking space 15 and obstructions 13, 14. A traveled route is detected via a route meter 16. The measured distance values are related by computer unit 12 to the distance values measured in particular by distance sensor 7 on right vehicle side 6. For example, if a parking space is determined on right vehicle side 6, both the length and also the width of the parking space are advantageously compared to vehicle data, which are stored in a memory unit 17 of analysis unit 11. If the parking space is large enough, computer unit 12 calculates a driving route which guides the vehicle from a current position into parking space 15. A corresponding trajectory 18, along which the vehicle is to be guided, is shown in FIG. 1.

In a first specific embodiment, a drive unit 20, a steering unit 21, and a brake unit 22 are controlled by analysis unit 11. By steering, accelerating, and braking vehicle 1, the vehicle may now be guided along previously calculated trajectory 18 into parking space 15.

In order to ensure according to the present invention that a driver monitors a driving space 19 at rear side 2 of the vehicle even during automatic guidance of the vehicle, analysis unit 11 is equipped via an interface 23 with a device 24 for approving the automatic guidance of the vehicle. A travel direction, in which the vehicle is to be controlled during the automatic guidance, is transmitted from analysis unit 11 via interface 23 to device 24 for approving the automatic guidance. The specification of the travel direction may include a rough specification, for example, forward or backward, in one specific embodiment, but in another specific embodiment it may also include a more precise direction specification by specifying a planned steering angle or steering angle curve.

A camera system 26, which detects a viewing direction of the driver in the direction of rear driving space 19, is connected to an interface 25 of device 24 for release. In a first specific embodiment it is provided for this purpose that camera system 26 detects the eyes of the driver. As long as the driver looks forward, i.e., in the direction of vehicle front side 4, the pair of eyes of the driver may not be detected by camera system 26. The pair of eyes of the driver is only detected when the driver is turned around. The relevant images of the camera system are analyzed by a computer unit 27 of the device for release. In one specific embodiment, device 24 for release may have a memory apparatus 28 for release, in which specific optical facial features of the driver are stored. In a further specific embodiment, instead of or in addition to a facial feature of the eye position, other facial features may be used for monitoring the viewing direction in this case, as well. These facial features may be a position of an ear or a position of the mouth of the driver, for example.

Furthermore, it is also possible, in particular in the case of a vehicle having head support, to accordingly detect a position of the head on the left and/or right side(s) of the head support, for example by a capacitive sensor system which is integrated in the head support for detecting a position of the head.

In a further specific embodiment, alternatively or additionally to the detection using camera 26 in a rear space of the vehicle, which is directed toward the driver, a camera 29 may also be provided in a front area of the vehicle, in particular in the dashboard of the vehicle. Camera 29 may accordingly detect a head orientation of the driver in the travel direction or [be] turned to the rear, i.e., in the direction of driving area 19.

In one specific embodiment, the field of vision is solely estimated in accordance with the detected eye position, head position, and/or other facial features. It is accordingly possible to provide corresponding limiting values for a detected eye or head position, for example, from which a look of the driver to the front through a windshield or a look of the driver to the rear through a rear window of the vehicle is established. Such an ascertainment may be sufficient for determining the field of vision for an application according to the present invention. This is because, since the field of vision of a human has a horizontal extension of a total of approximately 170°, it is possibly not necessary to detect the exact viewing direction of the driver through a rear window of the vehicle toward driving space 19. According to the present specific embodiment, it is only assessed whether the driving path, which the vehicle takes and which is fully visible through a rear window of the vehicle, is in the field of vision of the driver.

In the case of a more precise possible detection of a viewing direction of a driver, in a further specific embodiment, it may also be determined, for example, that the driving path of the vehicle must lie in a field of vision of the driver which ensures a color detection of the image via the eye and which only covers a horizontal angle of at most approximately 50°.

If it is determined by device 24 for release that driving space 19 is in the field of vision of the driver of the vehicle, automatic control of the vehicle is approved via analysis unit 11. In a further specific embodiment, it is additionally monitored whether the driver continues to monitor the driving path during the automatic guidance of the vehicle, i.e., the driver remains turned around toward driving area 19 of the vehicle along trajectory 18, for example, and thus still has the driving path in his field of vision. If it is determined at a later point in time that the driver no longer looks in the direction in which vehicle 1 is moving, by forwarding relevant information to analysis unit 11, device 24 for release causes the vehicle to be decelerated by an action on drive unit 20 and/or on brake unit 22, possibly to a standstill. If necessary, a corresponding warning may be output by analysis unit 11 via an output unit for this purpose, for example, a signal tone via a loudspeaker 30. In one specific embodiment, it may also be provided that for the case in which it is determined that the driver no longer has the driving path for automatic control in his field of vision, an acoustic warning is first output. Automatic deceleration is now performed with a time delay, for example two seconds, when the driving path is no longer detected by the field of vision of the driver. It may thus be prevented that briefly looking away to monitor other vehicles in the surroundings of the vehicle, for example, may already trigger automatic deceleration of the vehicle.

Figure 2:
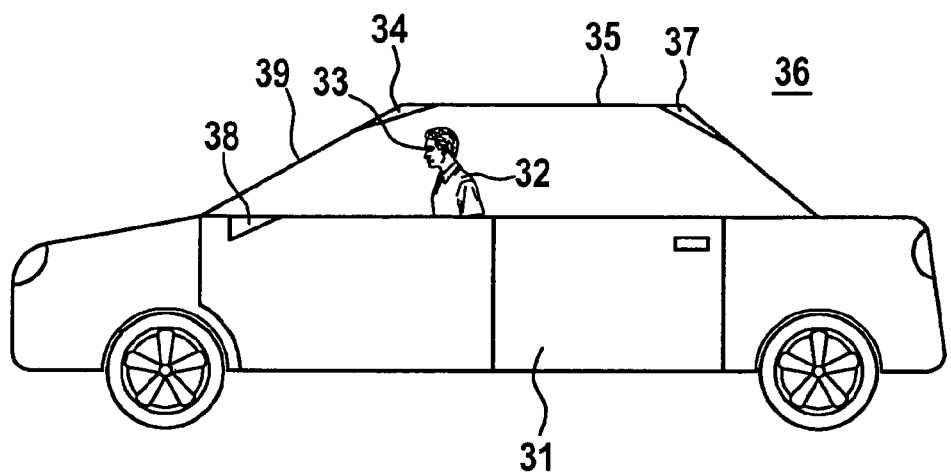
FIG. 2 shows a view of a vehicle having a device according to the present invention for approving automatic guidance of the vehicle in a side view.

Possible positions for camera systems are shown in FIG. 2. A driver 32, whose face 33 is detected by one or multiple camera systems in a vehicle, is shown in a motor vehicle 31. A first possible camera position 34 is shown on an A column of the vehicle in proximity to a vehicle roof 35. In order to detect a viewing direction of the driver toward a rear vehicle space 36, a further camera system 37 is situated on a vehicle rear side alternatively or additionally thereto. In a further specific embodiment, a camera system may also be provided on the dashboard. In one specific embodiment, camera device 38 is integrated into a head-up display, for example, and observes the driver via the optical pathway, in which a virtual image is overlaid in a windshield 39 of the vehicle.

Figure 3:
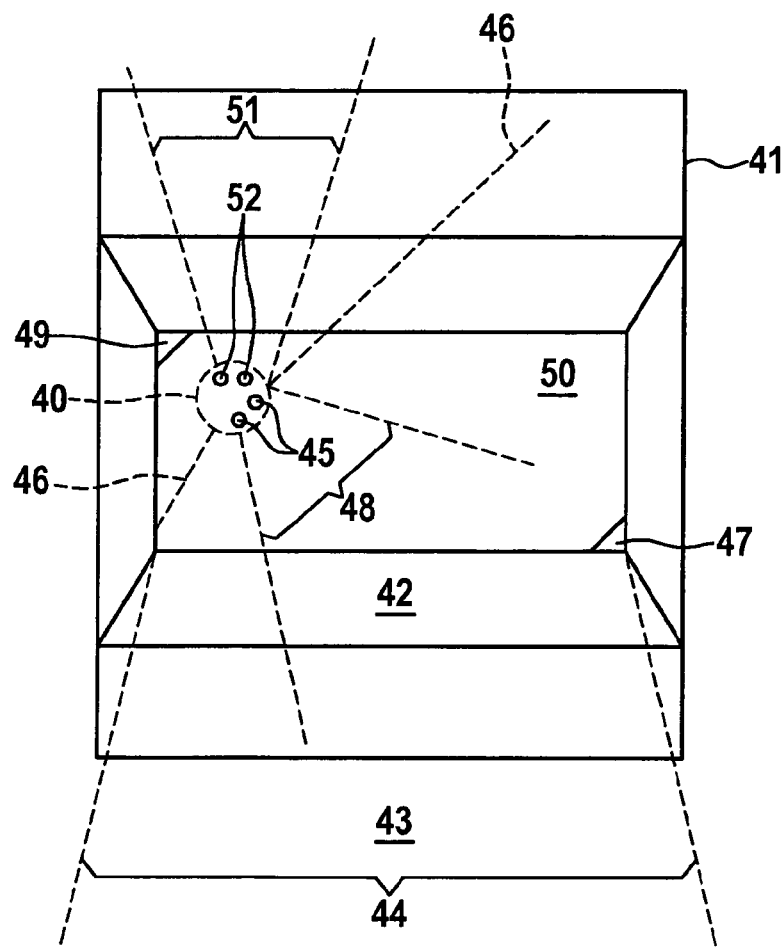
FIG. 3 shows a relevant vehicle in a top view.

A corresponding illustration of the various fields of vision and viewing of a driver 40 in a vehicle 41 is shown in FIG. 3. The driver may observe a rear driving space 43 through a rear window 42. Viewing angle range 44 which is absolutely required for observing rear driving space 43 is shown by a dashed line. If eyes 45 of driver 40 are in the position shown here, his field of vision 46, which is also shown by dashed lines, is sufficient for the purpose of overlooking entire viewing angle range 44 and thus driving space 43. A corresponding observation of the driver may be performed for this purpose via a camera system 47. In a first specific embodiment, automatic guidance of the vehicle in a reverse direction is already approved if it is determined that field of vision 46 covers angle range 44. In a further specific embodiment, it may also be provided that a central horizontal field of vision range 48 of the driver of +/−20° must completely detect angle range 44. In a further specific embodiment, a camera 49 may additionally be provided on a front corner of a vehicle roof 50 of vehicle 41 for monitoring automatic forward travel of the vehicle, in order to monitor a look 51 of the driver in a frontal direction of the vehicle for automatic control of the vehicle in a forward travel direction. Accordingly, an eye position 52 corresponding to viewing direction 51 is shown.

In addition to complete guidance of the vehicle via steering, acceleration, and braking, in another specific embodiment, partial automatic guidance of the vehicle may also be approved accordingly via a device 24 for approving automatic guidance, for example automatic steering of the vehicle, while the longitudinal guidance (i.e., the acceleration and braking of the vehicle) still resides with the driver. Accordingly, automatic acceleration or braking of the vehicle may thus be hindered or stopped, as long as the driver is not looking in the direction in which the automatic steering guides the vehicle.

Figure 4:
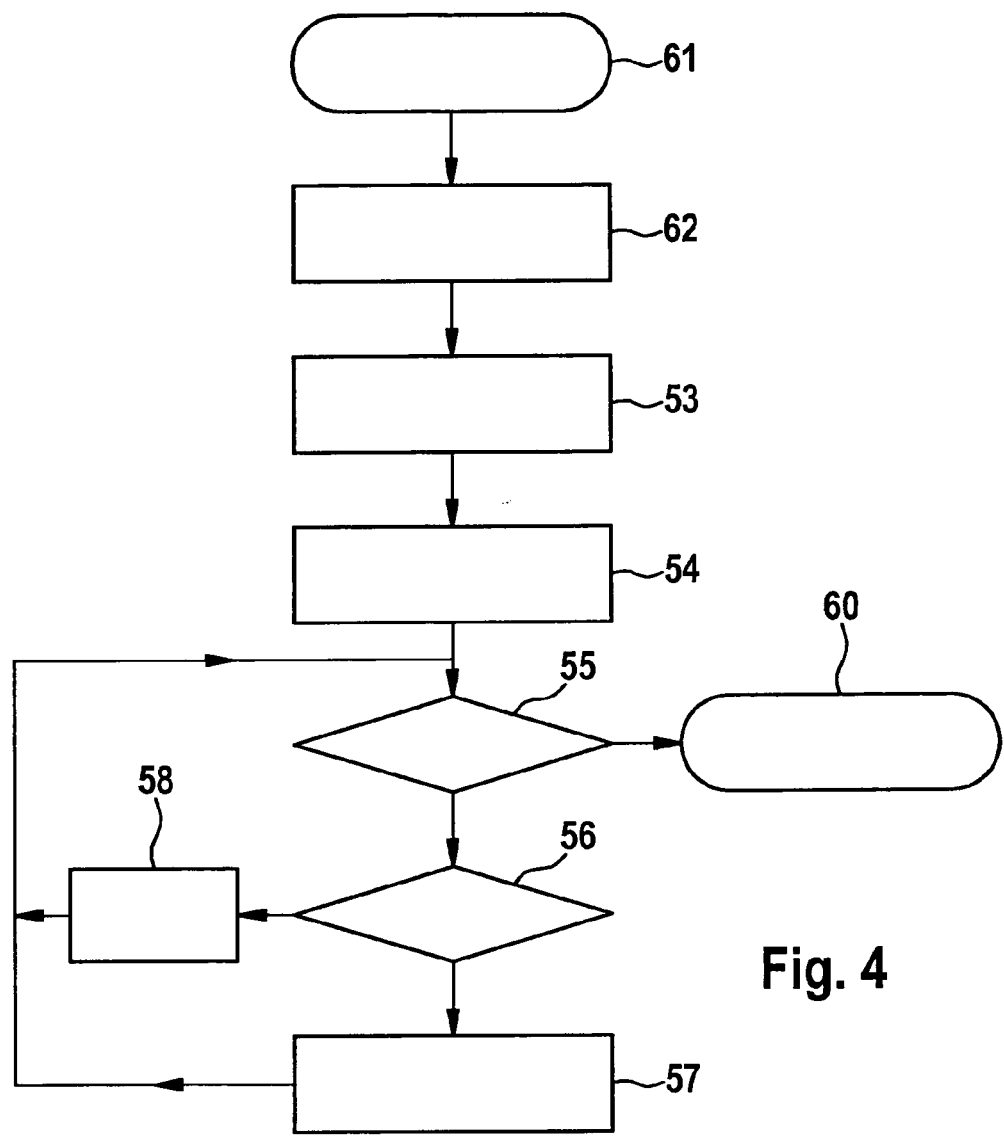
FIG. 4 shows an exemplary embodiment for carrying out a method according to the present invention.

An exemplary embodiment for a performance of the method according to the present invention is shown in FIG. 4. Starting from an initialization step 61, detection of a parking space is started. In a subsequent measuring step 62, vehicle surroundings are measured and potential parking spaces are measured with respect to their length and/or their width, in particular by distance sensors 7, 9, which are situated laterally on the vehicle. If a suitable parking space has been, found, in a calculation step 53, a parking trajectory from a current vehicle position into the ascertained parking space is calculated. In a subsequent warning and transfer step 54, the driver is informed, for example with the aid of an acoustic output via loudspeaker 30, of the fact that automatic guidance of the vehicle will now be performed. The driver may optionally start the automatic method during warning and transfer step 54, for example, by a manual confirmation. Furthermore, it is also possible that an automatic start is performed. Subsequently, the sequence branches to a first testing step 55, in which it is checked whether the driving destination, i.e., the final position of the vehicle in the parking space, has been reached. If so, the sequence branches to a final step 60 and the vehicle is stopped in the parking space.

If the driving destination has not yet been reached, instead the sequence branches from first testing step 55 to a second testing step 56. In second testing step 56 it is checked whether a driving path of the vehicle is in the field of vision of the driver. This is performed, for example, as explained above, via at least one camera system and computer unit 27. For this purpose, it is checked, for example, whether a camera on a roof of the vehicle near the rear window detects both eyes of the driver. If both eyes are detected by the camera, it is determined by the computer unit that the rear driving area of the vehicle is in the field of vision of the driver. Thus, if it is determined that the driver is looking in the travel direction, i.e., that his field of vision covers the essential driving area of the vehicle, the sequence branches to an activation step 57, in which the vehicle is guided along the driving route. Subsequently, the sequence branches back to first testing step 55, so that a check may be performed again after a particular prescribed driving distance, for example after 10 cm.

In contrast, if it is determined in second testing step 56 that the driver is not overlooking the driving space, that he looks to the front, for example, while the vehicle drives in reverse and therefore the driving path of the vehicle is not in the driver's field of vision, the sequence branches to a warning and pause step 58. If the vehicle is not yet moving, automatic guidance of the vehicle is not performed and a warning is optionally output to the driver, for example by the output of a warning tone via loudspeaker 30. If the vehicle is already in automatic guidance and is moving, a preferably acoustic warning is also output. In a further specific embodiment, the vehicle is additionally decelerated by a reduction of drive power and/or braking. Subsequently, the sequence also branches back to first testing step 55. In a first specific embodiment, it is sufficient that the driver looks again in the particular direction of the driving path of the vehicle to continue the automatic driving. In a further specific embodiment, it may also be provided that an additional manual approval of the automatic driving by the driver is required.

What is claimed is:
1. A device for approving automatic guidance of a vehicle, comprising:
    a camera system mounted in a rear space of the vehicle behind a vehicle driver, directed toward the driver, and monitoring a field of vision of the driver when backing into a parking space;

an interface to an apparatus for automatically guiding the vehicle and for ascertaining a reverse travel direction of the vehicle for backing into the parking space when automatic guidance is to be performed; and an analysis unit for comparing a field of vision of the driver, which is determined from the monitoring of the driver, to the travel direction of the vehicle during the automatic guidance, wherein automatic guidance is only approved if the reverse travel direction of the vehicle during the automatic guidance is in the field of vision of the driver.

2. The device as recited in claim 1, wherein the vehicle is automatically guided in reverse into a parking space.

3. The device as recited in claim 1, wherein the camera system ascertains a head position of the vehicle driver to determine the field of vision of the driver from the ascertained head position of the driver.

4. The device as recited in claim 2, wherein the camera system ascertains a viewing direction of the vehicle driver to determine the field of vision of the driver from the ascertained viewing direction.

5. The device as recited in claim 3, wherein the camera system is situated on a vehicle roof.

6. A method for approving automatic guidance of a vehicle, comprising:

monitoring a field of vision of a driver located in the vehicle when backing into a parking space using a camera mounted in a rear space of the vehicle behind the driver and directed toward the driver;

ascertaining a reverse travel direction of the vehicle for backing into the parking space when automatic guidance is to be performed; and comparing the ascertained travel direction to the ascertained field of vision of the driver, wherein automatic guidance is only approved if the reverse travel direction of the vehicle during the automatic guidance is in the ascertained field of vision of the driver.

7. The method as recited in claim 6, wherein at least one of a head position and a viewing direction of the driver is ascertained, and the field of vision of the driver is determined from at least one of the ascertained head position and the viewing direction.

8. The method as recited in claim 6, wherein approval of automatic guidance is canceled when it is determined that the travel direction of the vehicle during the automatic guidance is no longer in the field of vision of the driver.

9. The method as recited in claim 7, wherein approval of automatic guidance is canceled when it is determined that the travel direction of the vehicle during the automatic guidance is no longer in the field of vision of the driver.

10. The method as recited in claim 8, wherein the vehicle is automatically decelerated in the event of cancellation of approval of the automatic guidance.

11. The method as recited in claim 9, wherein the vehicle is automatically decelerated in the event of cancellation of approval of the automatic guidance.

12. The method as recited in claim 10, wherein a warning for notification of an imminent or beginning automatic deceleration is output with or before initiation of an automatic deceleration.

13. The method as recited in claim 11, wherein a warning for notification of an imminent or beginning automatic deceleration is output with or before initiation of an automatic deceleration.

14. The method as recited in claim 6, further comprising:

detecting a position of a head of the driver on a head support using a sensor system integrated into the head support; and monitoring the field of vision of the driver based in part on the detected head position of the driver.

15. The method as recited in claim 6, further comprising:

detecting a head orientation of the driver using a camera mounted in a dashboard of the vehicle front of the driver sensor system integrated into the head support; and monitoring the field of vision of the driver based in part on the detected head orientation of the driver and the field of vision of the driver when backing into a parking space using the camera mounted in the rear space of the vehicle behind the driver and directed toward the driver.

* * * * *

UNITED STATES PATENT AND TRADEMARK OFFICE
CERTIFICATE OF CORRECTION

PATENT NO. : 8,493,199 B2  
APPLICATION NO. : 12/737205  
DATED : July 23, 2013  
INVENTOR(S) : Koehler et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 277 days.

Signed and Sealed this
Eighth Day of September, 2015

Michelle K. Lee
*Director of the United States Patent and Trademark Office*